United States Patent [19]
Baboudjian et al.

[11] Patent Number: 5,573,739
[45] Date of Patent: Nov. 12, 1996

[54] SELECTIVE BISMUTH AND ANTIMONY REMOVAL FROM COPPER ELECTROLYTE

[75] Inventors: Viken P. Baboudjian, Pointe-Claire; Jack S. Stafiej, Dorval, both of Canada

[73] Assignee: Noranda, Inc., Toronto, Canada

[21] Appl. No.: 330,794

[22] Filed: Oct. 28, 1994

[51] Int. Cl.$^6$ .................................................. C22B 15/14
[52] U.S. Cl. ................................................ 423/87; 205/586
[58] Field of Search ................................ 204/108, 106, 204/DIG. 13; 423/87; 210/702, 709; 205/586

[56] References Cited

U.S. PATENT DOCUMENTS

| | | | |
|---|---|---|---|
| 3,696,012 | 10/1972 | Schulze | 204/108 |
| 3,917,519 | 11/1975 | Fisher et al. | 204/108 |
| 4,030,990 | 6/1977 | Piret | 204/108 |
| 4,061,564 | 12/1977 | De Schepper et al. | 210/21 |
| 4,083,761 | 4/1978 | Houlachi et al. | 204/130 |
| 4,124,460 | 11/1978 | Loutfy | 204/108 |
| 4,149,880 | 4/1979 | Prater et al. | 75/117 |
| 4,157,946 | 6/1979 | Hyvärinen | 204/108 |
| 4,379,127 | 4/1983 | Bauer et al. | 423/55 |
| 4,404,071 | 9/1983 | Abe et al. | 204/108 |
| 4,447,403 | 5/1984 | Bierman et al. | 423/20 |
| 5,039,496 | 8/1991 | Kehl et al. | 423/94 |
| 5,108,721 | 4/1992 | Baboudjian et al. | 423/150 |
| 5,213,785 | 5/1993 | Fentress et al. | 423/617 |
| 5,366,715 | 11/1994 | Dreisinger | 423/531 |

FOREIGN PATENT DOCUMENTS

| | | | |
|---|---|---|---|
| 2005646 | 4/1979 | United Kingdom | C01B 17/90 |

OTHER PUBLICATIONS

Biswas et al., "Extractive metallurgy of copper", Pergamon Press, 1976, pp. 310–312.
Oda et al., "*Tamano chelating resin adsorption process*", in Metallurgical Review of MMIJ, vol. 3, No. 2, Nov. 1986.
Early disclosure of Canadian Patent Application 107,793 Aug. 19, 1980.
Dreisinger et al., "The solvent extraction and ion exchange removal of As, Sb and Bi from copper refining electrolytes", report dated Jan. 20, 1992.

*Primary Examiner*—Bruce F. Bell
*Assistant Examiner*—Brendan Mee
*Attorney, Agent, or Firm*—Fitzpatrick, Cella, Harper & Scinto

[57] ABSTRACT

The present invention is concerned with a process for selectively removing antimony, bismuth, or both, from acidic solution by submitting the solution to oxidizing conditions thereby causing the selective precipitation of antimony and bismuth; filtering precipitated antimony and bismuth; and submitting the oxidized solution to reducing conditions before it is returned to the electrorefining cell.

7 Claims, No Drawings

SELECTIVE BISMUTH AND ANTIMONY REMOVAL FROM COPPER ELECTROLYTE

FIELD OF THE INVENTION

The present invention is concerned with a process for removing antimony and bismuth from acidic solutions, and more particularly electrolytes used in copper electrorefining and electrowinning.

BACKGROUND OF THE INVENTION

The electrorefining of copper consists in the simultaneous electrolytic dissolution of copper from a relatively impure anode and the plating of relatively pure copper onto a cathode in a copper sulphate, sulphuric acid electrolyte. The copper anode contains a number of impurities that are separated from the copper during the electrorefining process. Typical impurities are precious metals, nickel, lead, iron, selenium, tellurium, arsenic, antimony and bismuth. Most of the impurities form an insoluble slime which falls to the bottom of the cell and is normally treated for by-product metal recovery. However, some of these impurities, notably antimony and bismuth, are soluble in the electrolyte and accumulate as the electrorefining proceeds. If left unchecked, the antimony and bismuth present in the electrolyte will increase to the point where they contaminate the copper cathode. It is therefore necessary, and in fact a general practice in copper electrorefining, to remove antimony and bismuth from the electrolyte.

Iron is another metal usually present in copper electrolyte. It is well known that iron causes two undesirable phenomena during copper electrorefining, namely 1) the $Fe^{3+}+e^-\rightarrow Fe^{2+}$ reaction consumes current, thus reducing current efficiency; and 2) the $Fe^{3+}+\frac{1}{2}Cu^0\rightarrow Fe^{2+}+\frac{1}{2}Cu^{2+}$ reaction causes corrosion of the copper cathode especially at the surface where the $Fe^{2+}$ is more apt to be oxidized. This is particularly a problem for cathodes employing copper suspension loops. Therefore it is desirable to maintain dissolved iron levels to a minimum and to prevent electrolyte oxidation during copper electrorefining.

In view of the criticality of the concentration of the above elements in copper electrolyte solutions, many processes have been proposed for removing antimony and bismuth from copper refining electrolyte.

Biswas et al. in *Extractive metallurgy of copper*, 1$^{rst}$ Edition, Pergamon Press, 1976, 310–312 describes the removal of antimony and bismuth from copper electrolyte by passing the solution through a series of electrowinning cells which precipitates the antimony and bismuth in elemental form. Drawbacks associated with this process are: 1) most of the copper in the electrolyte has to be electrowon first before reducing antimony and bismuth; 2) the volume of electrolyte that can be withdrawn for treatment is limited by the amount of soluble copper (oxide) entering the electrolyte from the anodes; 3) arsine formation, a toxic gas, may occur; and 4) the antimony and bismuth residue produced contains large mounts of arsenic, copper and lead which makes treatment of this residue arduous and complex.

Another process currently in commercial use is ion exchange, such as that disclosed by Dreisinger et al. in Final Report CANMET, project No. 0748, Jan. 20, 1992, and Oda et al. in *Metallurgical Review of M. M. I. J.*, Vol. 3, No. 2, November 1986, Symposium Proceedings. The processes consist in passing some copper electrolyte solution through a resin that is specific for antimony and bismuth. Once the resin is loaded, it is stripped, usually with hydrochloric acid, and washed with water. Problems associated with this process are 1) the consumption of large mounts of reagents, mainly hydrochloric acid; 2) the strip solution has to be treated for antimony and bismuth recovery; 3) treatment of hydrochloric acid and water effluent; 4) the resin has a limited useful life, and must therefore be replaced periodically; 5) $Fe^{3+}$ tends to adsorb on the resin, which reduces the resin capacity; and 6) the risk of chloride ion contamination of the electrolyte. An improvement of this process has been proposed in U.S. patent application Ser. No. 08/138,024 filed Oct. 19, 1993, wherein the $Fe^{3+}$ is reduced to $Fe^{2+}$ before passing the solution in the resin column.

Solvent extraction has been found capable of removing antimony and bismuth from mineral acid electrolytes, as disclosed in U.S. Pat. No. 4,061,564 and U.S. Pat. No. 5,039,496. In such process, the electrolyte is mixed with an appropriate sparingly-soluble organic solvent which preferentially extracts antimony and bismuth. The antimony and bismuth need to be stripped from the solvent in order for the solvent to be reused. The drawbacks for this process are similar to those of ion exchange. Effluents need to be treated, the solvent needs to be replenished and there is a lot of solution mixing and manipulation.

Adsorption onto a low-solubility metal-oxide hydrate has also been proposed in 3,696,012 for removing antimony and bismuth. However, the material needs to be regenerated with either nitric, hydrochloric or sulphuric acid, and the effluent treated.

GB 2,005,646 and JP-197-14583 are concerned with the addition of $Bi_2O_3$ and/or $Sb_2O_3$ for removing antimony and bismuth from copper electrolyte. Addition of these species to the electrolyte appears to upset the equilibrium between arsenic, bismuth and antimony, which causes them to precipitate below their original concentrations. From 3 to 10 g/L of either product, or both, along with a minimum of 3 g/L of arsenic is needed for the precipitation to occur.

The copper electrolyte may also be treated with barium, strontium or lead carbonate, as proposed in U.S. Pat. No. 4,157,946. Addition of either of these carbonates is found to precipitate bismuth, and to a lesser extent, antimony. This method however, like many of those described above, consumes significant amounts of reagents and requires treatment of important quantities of residues.

Treatment of copper electrolyte with $H_2S$ after partial decoppering has also been proposed in U.S. Pat. No. 4,404,071. This approach uses $H_2S$ gas to precipitate arsenic, antimony and bismuth from a copper electrolyte pretreated to reduce the copper concentration to 10–13 g/L. This remaining copper however is also precipitated with $H_2S$.

Adsorption of antimony onto activated carbon is the subject of an article of Toyabe et al. in *The electrorefining of copper*, TMS-AIME, Warrendale, Pa., 1987, 117–128. This process is in use at the Sumitomo Niihama Copper Refinery in Japan, but is much less effective for bismuth than it is for antimony. Further, important amounts of activated carbon are consumed and treated.

In view of the above discussion, it would therefore be highly desirable to develop a process for the removal of antimony and bismuth. This process should be preferably highly selective toward antimony and bismuth, and require minimal amounts of reagents.

SUMMARY OF THE INVENTION

According to the present invention, there is now provided a process for the selective removal of antimony and bismuth from acidic solution, which comprises submitting the solution to oxidizing conditions, thus causing precipitation of antimony and bismuth, filtering the thus precipitated antimony and bismuth, and reducing the oxidized electrolyte before it is returned to the electrorefining cell.

In a preferred embodiment, the acidic solution is copper electrolyte.

DETAILED DESCRIPTION OF THE INVENTION

The process of the present invention comprises oxidizing an acidic solution, typically sulphuric acid copper electrolyte solution, in an autoclave under oxygen overpressure at a temperature varying from 130° to 205° C., to induce the precipitation of antimony and bismuth. The minimum oxygen partial pressure has been found to be 1.2 bar. For practical and obvious economic purposes, the oxygen partial pressure needs not to exceed 6 bars. As an alternative to oxygen, air may also be injected.

Antimony and bismuth are subsequently removed by simple filtration, and the oxidized electrolyte is then reduced to bring the $Fe^{3+}$ to $Fe^{2+}$ oxidation state, and returned to the commercial electrorefining cells without the previously mentioned detrimental effects of reduced current efficiency and corrosion of the copper cathode. The reduction is preferably done by passing the solution through a bed of copper particles, but any other conventional means of reduction can be applied, for example, treatment in an electrorefining cell.

The process of the present invention has therefore many advantages over those currently known, in particular: a) the purification is selective to antimony and bismuth and no other element needs to be prereduced or is precipitated concurrently, which greatly reduces the weight of solids to be collected and/or treated; b) an adsorption agent such as a resin, is not required, and neither is an organic solvent nor an inorganic compound; c) there are no solution to strip and no liquid effluent to treat, thereby minimizing the manipulations of the electrolyte solution; d) the operating temperatures of the autoclave are low enough so that plant steam can be used for heating the electrolyte; e) the electrolyte is returned to the cell at the same oxidation state, thus preventing reduced current efficiency and copper cathode corrosion caused by $Fe^{3+}$ ions; and f) the process can be run continuously, thus helping automation and minimizing equipment size.

The present invention will now be illustrated by examples which are provided for illustrating preferred embodiment of the invention, and should not be construed as limited its scope.

EXAMPLE 1

A commercial copper electrolyte is treated in an autoclave at various temperatures and oxygen pressures to determine the antimony and bismuth precipitation kinetics under different conditions. The composition of the electrolyte is as follows: 45 g/L copper; 165 g/L free sulphuric acid; 18 g/L nickel; 0.40 g/L iron; 3.5 g/L arsenic; 0.15–0.18 g/L bismuth and 0.42–0.50 g/L antimony. Comparative tests have been performed on synthetic copper electrolyte wherein the only impurities present are antimony and/or bismuth. The results of the tests are provided hereinbelow.

1. Temperature

Table 1 shows that the rise in the antimony and bismuth precipitation rates with the temperature for the commercial copper electrolyte solution.

TABLE 1

Precipitation rate of Sb and Bi in function of the temperature (Oxygen Pressure between 1–6 bars)

| T (°C.) | Sb precipitation rate at 1 hr (mg/L/hr) | Bi precipitation rate at 1 hr (mg/L/hr) |
|---|---|---|
| 104 | 18 | 7 |
| 132 | 80 | 22 |
| 160 | 170 | 98 |
| 204 | 330 | 144 |

Assuming that the concentration of antimony and bismuth in the solution is respectively 0.47 and 0.17 g/L, about 70% of the antimony and 85% of the bismuth is precipitated in one hour at a temperature of 204° C.

2. Oxygen Pressure

A minimum oxygen overpressure of around 1.2 bars is sufficient to carry out the process of the present invention, as illustrated by Table 2 below. Little increase is noticed at higher oxygen pressure.

TABLE 2

Precipitation rate of antimony and bismuth in function of the pressure of oxygen (Temperature = 132° C.)

| $O_2$ pressure (bars) | Sb precipitation rate at 3 hr (mg/L/hr) | Bi precipitation rate at 3 hrs (mg/L/hr) |
|---|---|---|
| 0.4 | 22 | 10 |
| 1.2 | 58 | 24 |
| 5.4 | 50 | 30 |
| 15.5 | 59 | 29 |

It should be pointed out that in addition to oxygen, good results have been obtained with air. However, oxygen is most preferred because of the major presence of nitrogen in air, an increased total operating pressure is necessary ($\geq$ than 4.8 bars).

3. Oxygen Sparging

A test is performed with no bleed to determine whether oxygen sparging is necessary. Comparing the test with the results of test 2, which had a bleed, it is found that there is very little improvement with oxygen sparging. The results are shown in Table 3.

TABLE 3

Precipitation rate of antimony and bismuth in function of oxygen sparging (Temperature = 132° C.; Oxygen Pressure = 1.2 bar)

| $O_2$ bleed | Sb precipitation rate at 3 hr (mg/L/hr) | Bi precipitation rate at 1 hr (mg/L/hr) |
|---|---|---|
| no | 43 | 18 |
| yes | 58 | 24 |

4. Agitation

A mild agitation of 0.5 hp/1000 USG has proven to give optimal results. It should be noted that acceptable precipitation rates of antimony and bismuth are also obtained with no agitation, as illustrated in Table 4.

TABLE 4

Precipitation rate of antimony and bismuth in
function of the agitation
(Temperature = 132° C.; Oxygen Pressure = 1.2 bar)

| BP/1000 USG | Sb precipitation rate at 3 hr (mg/L/hr) | Bi precipitation rate at 1 hr (mg/L/hr) |
|---|---|---|
| 0 | 36 | 19 |
| 0.5 | 58 | 24 |
| 15 | 51 | 25 |

5. Electrolyte Composition

The final parameter investigated is the composition of the electrolyte. It can be assumed that the process has two components, namely the actual oxidation of the antimony and bismuth and their precipitation due to the lower solubility of the higher oxidation states. This solubility can be effected by variations in the composition of the electrolyte. Two series of three tests (i.e., at two different temperatures) are done where the only impurities present are antimony and/or bismuth (synthetic electrolytes). The results are provided in Tables 5 and 6.

TABLE 5

Precipitation of antimony and bismuth in synthetic solutions
Temperature = 132° C.; Oxygen Pressure = 1.2 bar; no bleed

| Electrolyte composition | Sb precipitation rate at 3 hr (mg/L/hr) | Bi precipitation rate at 3 hr (mg/L/hr) |
|---|---|---|
| 45 g/l Cu; 165 g/L $H_2SO_4$; 0.18 g/L Bi | — | 7 |
| 45 g/l Cu; 165 g/L $H_2SO_4$; 0.40 g/L Sb | 29 | — |
| 45 g/l Cu; 165 g/L $H_2SO_4$; 0.18 g/L Bi; 0.43 g/L Sb | 37 | 16 |

TABLE 6

Precipitation of antimony and bismuth in synthetic solutions
Temperature = 160° C.; Oxygen Pressure = 1.4 bar

| Electrolyte composition | Sb precipitation rate at 4 hr (mg/L/hr) | Bi precipitation rate at 4 hr (mg/L/hr) |
|---|---|---|
| 45 g/l Cu; 165 g/L $H_2SO_4$; 0.20 g/L Bi | — | 1 |
| 45 g/l Cu; 165 g/L $H_2SO_4$; 0.46 g/L Sb | 46 | — |
| 45 g/l Cu; 165 g/L $H_2SO_4$; 0.19 g/L Bi; 0.44 g/L Sb | 73 | 35 |

It was found that the precipitation rates were lower for synthetic solutions when antimony or bismuth are present separately. When both elements are present, the rates increase to values comparable to those with the commercial copper electrolyte. Therefore, it is advantageous to have both antimony and bismuth in the solution to obtain more effective precipitation.

While the invention has been described in connection with specific embodiments thereof, it will be understood that it is capable of further modifications and this application is intended to cover any variations, uses or adaptations of the invention following, in general, the principles of the invention and including such departures from the present disclosure as come within known or customary practice within the art to which the invention pertains, and as may be applied to the essential features hereinbefore set forth, and as follows in the scope of the appended claims.

What is claimed is:

1. A process for selectively removing antimony, bismuth, or both, dissolved in an acidic solution, which process comprises:

providing a solution in which antimony, bismuth, or both are dissolved in an acidic solution having substantially no solids;

submitting the solution to oxidizing conditions in an autoclave thereby causing the selective precipitation of antimony and bismuth in the form of oxides;

filtering precipitated antimony and bismuth oxides; and submitting the oxidized solution to reducing conditions.

2. A process according to claim 1 wherein the acidic solution is a sulphuric acid solution.

3. A process according to claim 2 wherein the solution is copper electrolyte.

4. A process according to claim 1 wherein the solution is oxidized in an autoclave with an oxygen overpressure.

5. A process according to claim 1 wherein the oxidation is carried out at a temperature varying from 130° to 205° C.

6. A process according to claim 1 wherein the reduction is carried out by passing the solution through a bed of copper particles.

7. A process for selectively removing antimony and bismuth dissolved in copper electrolyte solution, which process comprises:

placing spent electrolyte from an electrorefining cell in an autoclave and maintaining an oxygen overpressure of at least 1.2 bars at a temperature of from 130° to 205° C., thereby causing selective precipitation of antimony and bismuth in the form of oxides;

filtering the precipitated antimony and bismuth oxides; and submitting the oxidized electrolyte to reducing conditions before it is returned to the electrorefining cell.

* * * * *